(12) United States Patent
Kim

(10) Patent No.: US 7,716,926 B2
(45) Date of Patent: May 18, 2010

(54) CONTROL APPARATUS FOR ENGINE-POWERED FORKLIFTS

(75) Inventor: Seo Hyung Kim, Incheon (KR)

(73) Assignee: Doosan Infracore Co., Ltd., Incheon (KR)

( * ) Notice: Subject to any disclaimer, the term of this patent is extended or adjusted under 35 U.S.C. 154(b) by 515 days.

(21) Appl. No.: 11/609,452

(22) Filed: Dec. 12, 2006

(65) Prior Publication Data

US 2007/0144163 A1 Jun. 28, 2007

(30) Foreign Application Priority Data

Dec. 13, 2005 (KR) ...................... 10-2005-0122474

(51) Int. Cl.
*F16D 31/02* (2006.01)
(52) U.S. Cl. ...................................................... 60/431
(58) Field of Classification Search .................... 60/431
See application file for complete search history.

(56) References Cited

U.S. PATENT DOCUMENTS

| 4,274,257 | A | * | 6/1981 | Koch et al. | .................... 60/431 |
| 4,697,418 | A | * | 10/1987 | Okabe et al. | .................. 60/431 |
| 5,592,817 | A | * | 1/1997 | Nishimura et al. | ............ 60/431 |

* cited by examiner

*Primary Examiner*—F. Daniel Lopez
(74) *Attorney, Agent, or Firm*—Patent Law Group LLP; Carmen C. Cook

(57) ABSTRACT

Disclosed herein is a control apparatus for an engine-powered forklift. The control apparatus of the present invention includes a mode detecting means for detecting whether the forklift is in a traveling mode or a working mode, and a controller, which controls the engine of the forklift such that, when the forklift is in the traveling mode, the output of the engine is restricted from increasing to a preset output value or more, and, when the forklift is in the working mode, the output of the engine is allowed to increase to the preset output value or more.

5 Claims, 3 Drawing Sheets

US 7,716,926 B2

CONTROL APPARATUS FOR ENGINE-POWERED FORKLIFTS

BACKGROUND OF THE INVENTION

This application claims the benefit of the Korean Patent Application No. 10-2005-122474, filed on Dec. 13, 2005, which is hereby incorporated by reference as if fully set forth herein.

1. Field of the Invention

The present invention relates generally to control apparatuses for engine-powered forklifts and, more particularly, to a control apparatus for an engine-powered forklift which is constructed such that, when the forklift is in a working mode, the output of an engine is allowed to be increased higher than a preset output value, and, when the forklift is in a traveling mode, the output of the engine is restricted to the preset output value to restrict the traveling speed of the forklift.

2. Description of the Related Art

As well known to those skilled in the art, an engine-powered forklift has an engine, a hydraulic pump, and actuators. The hydraulic pump is driven by the engine, so that the forklift travels and turns. The actuators are operated by using hydraulic oil discharged from the hydraulic pump.

Furthermore, the engine-powered forklift can travel and turn with loading a heavy cargo thereon. However, if the traveling speed of the forklift, on which the cargo is loaded, is excessively high, the cargo may undesirably fall down, or the forklift may tip over. Furthermore, in the case where the forklift is operated at a relatively high speed in an indoor place, for example a warehouse, there is a possibility of a safety hazard in which it may strike a person.

In an effort to overcome the above problems, an apparatus that restricts the traveling speed of a forklift from increasing higher than a predetermined speed was proposed.

The conventional traveling speed restriction apparatus for the forklift includes a stopper. The stopper of the conventional restriction apparatus is disposed below an accelerator pedal and prevents the rotation of the accelerator pedal beyond a predetermined position, when the accelerator pedal is pushed. Therefore, the output of an engine is prevented from being increased to a value higher than a preset output value. Thereby, the traveling speed of the forklift is restricted to the specified speed.

However, the conventional traveling speed restriction apparatus is problematic in that, because the output of the engine is restricted to the preset output value, the driving force of an actuator is also restricted.

In detail, due to the characteristics of the engine-powered forklift, when the actuators are operated for tilting a mast assembly or lifting a carriage with loading the heavy cargo, the accelerator pedal must be pushed beyond the predetermined position in order to increase the output of the engine for ensuring smooth and powerful operation. However, in the conventional traveling speed restriction apparatus, because the distance that the accelerator pedal is pushed is restricted, the output of the engine cannot be increased higher than the preset output value.

As such, because the output of the engine cannot be increased higher than the preset output value, the driving force of the actuator is restricted. Due to the restriction of the driving force of the actuator, there are problems in that the mast assembly cannot be smoothly tilted, and the carriage cannot be smoothly lifted.

SUMMARY OF THE INVENTION

Accordingly, the present invention has been made keeping in mind the above problems occurring in the prior art, and an object of the present invention is to provide a control apparatus for engine-powered forklifts which prevents safety hazards and ensures smooth operation of an actuator.

In order to accomplish the above object, the present invention provides a control apparatus for an engine-powered forklift, including: a hydraulic pump operated by an engine; a main line for supplying hydraulic oil from the hydraulic pump to an actuator and a speed change device; an inching valve provided on the main line and interrupting supply of the hydraulic oil to the speed change device in a working mode in which the actuator is operated; a mode detecting means for detecting whether the forklift is in a traveling mode or a working mode; and a controller to control the engine such that, when the forklift is in the traveling mode, output of the engine is restricted from increasing to a preset output value or more, and, when the forklift is in the working mode, the output of the engine is allowed to increase to the preset output value or more.

Preferably, the mode detecting means may include a pressure switch provided on a hydraulic pressure line which connects the inching valve to the speed change device. The pressure switch may output a detection signal to the controller when a pressure of the hydraulic oil supplied from the inching valve to the speed change device is reduced to a preset pressure or less.

Furthermore, the preset pressure may be a pressure of the hydraulic oil when the supply of the hydraulic oil to the speed change device is interrupted.

In addition, the control apparatus may further comprise an ON/OFF means for turning on/off a function of restricting an increase in the output of the engine when the forklift is in the traveling mode.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, a control apparatus for engine-powered forklifts according to a preferred embodiment of the present invention will be described in detail with reference to the attached drawings.

Figure 1:
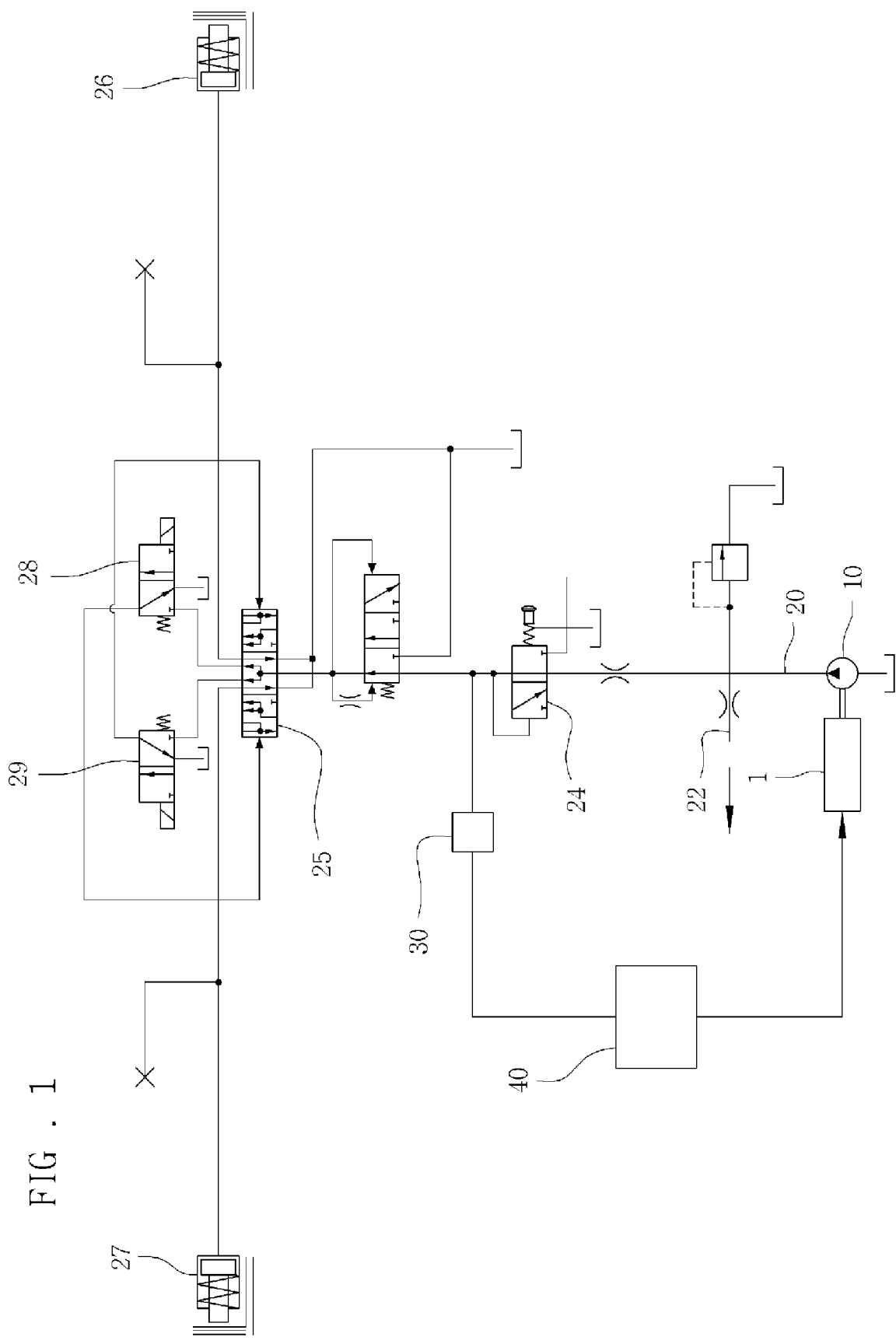
FIG. 1 is a view schematically showing a control apparatus for engine-powered forklifts, according to an embodiment of the present invention.

A brief explanation of a speed change control device and an inching device of an engine-powered forklift with reference to FIG. 1 will precede the description of the control apparatus for engine-powered forklifts according to the present invention.

The speed change control device is connected to a hydraulic pump 10, which is driven by an engine 1, through a main line 20.

A branch line 22 is branched from the main line 20. The branch line 22 supplies hydraulic pressure to several actuators, including a lift cylinder and a tilt cylinder, which are not shown in the drawing.

An inching valve 24 and a control valve 25 are provided on the main line 20.

The inching valve 24 serves to supply hydraulic oil of the hydraulic pump 10 to the actuators at high pressure in a working mode. The inching valve 24 is operated by pushing an inching pedal, which is not shown in the drawing, and interrupts the supply of hydraulic oil into forward and backward clutches 26 and 27 of the speed change device. Therefore, when the inching pedal is manipulated, the hydraulic oil of the main line 20 is supplied to the actuators, including the lift cylinder and the tilt cylinder, at high pressure through the branch line 22. In this case, the pressure of the hydraulic oil between the inching valve 24 and the control valve 25 is rapidly reduced.

The control valve 25 supplies hydraulic oil from the hydraulic pump 10 to the forward clutch 26 or the backward clutch 27 of the speed change device, and is operated by a forward solenoid valve 28 and a backward solenoid valve 29. The forward and backward solenoid valves 28 and 29 are operated by manipulation of an operating lever (not shown) by a driver.

Next, the control apparatus for a forklift according to the present invention will be explained. As shown in FIG. 1, the control apparatus according to the embodiment of the present invention includes a mode detecting means for detecting whether the forklift is in a working mode or in a traveling mode.

In the embodiment of the present invention, the mode detecting means includes a pressure switch 30. The pressure switch 30 is provided on a hydraulic line that is disposed between the inching valve 24 and the speed change device.

The pressure switch 30 detects the pressure of hydraulic oil of a downstream side of the inching valve 24 connecting the speed change device, and outputs a signal. Particularly, the pressure switch 30 is constructed such that it is turned on when the pressure of hydraulic oil of the downstream side of the inching valve 24 is a preset pressure or less as the inching valve 24 is operated.

When the operation of the inching valve 24 is detected by the pressure switch 30, the signal output from the pressure switch 30 is input to a controller 40, installed in the forklift to control the engine 1. After the signal is input to the controller 40, the controller 40 determines that the forklift is in working mode.

Conversely, because the pressure switch 30 is turned off when the pressure of hydraulic oil on the downstream side of the inching valve 24 is greater than the preset pressure, the supply of hydraulic oil to the forward and backward clutches 26 and 27 is detected, thereby the controller 40 determines that the forklift is in the traveling mode. As such, in the case where the mode detecting means comprises the pressure switch 30, even if the driver mistakenly manipulates the inching pedal, this is not determined to be the working mode until the pressure of hydraulic line between the inching valve 24 and the speed change device is decreased to the preset pressure or less. In other words, only when the forklift is used for substantial work can the mode detecting means output a signal. Therefore, the reliability of detection of the mode of the forklift can be enhanced.

Meanwhile, the preset pressure of the pressure switch 30 is set at a predetermined value depending on a specification of the forklift, for example a relationship between a rpm of the engine and a speed of the forklift. In this embodiment, the preset pressure is set at approximately 1.5 bar. The reason for this is that, when the pressure of the hydraulic oil on the downstream side of the inching valve 24 is 1.5 bar or less, the hydraulic oil in the main line 20 is supplied to the actuators while the supply of hydraulic oil to the forward and backward clutches 26 and 27 is interrupted entirely. That is, the reason is that, only when the pressure of hydraulic oil on the downstream side of the inching valve 24 is 1.5 bar or less is the forklift determined to be in the working mode.

Although the pressure switch 30 has been described as an example of the mode detecting means, the mode detecting means is not limited to the example shown in this embodiment. In other words, a mode detecting means having any structure can be applied to the present invention as long as it can determine the working/traveling mode of the forklift. For example, the mode detecting means of the present invention may have a mechanical switch structure to detect mechanically whether the forklift is in the working mode is determined by detecting whether the inching pedal is manipulated, and may have a structure in which whether the forklift is in the traveling mode is determined by detecting the rotation of the wheels of the forklift.

Meanwhile, referring to FIG. 1, the travel speed control device of the present invention includes the controller 40, which controls the engine 1 depending on signals of the pressure switch 30.

The controller 40 according to this embodiment of the present invention comprises a microprocessor. If the ON signal is not input to the controller 40 from the pressure switch 30, the controller 40 controls the output of the engine 1 to prevent from increasing the rpm of the engine 1 over a preset rpm. When an ON signal is input from the pressure switch 30, the controller 40 allows the rpm of the engine 1 to increase higher than the preset rpm.

In detail, if the ON signal is not input to controller 40 from the pressure switch 30, the forklift is determined to be in the traveling mode by the controller 40, so that the rpm of the engine 1 is prevented from increasing to a value higher than the preset rpm. In this case, even if the driver pushes the accelerator pedal further, because the rpm of the engine 1 is restricted, the traveling speed of the forklift is restricted to a predetermined value.

If the ON signal is input to controller 40 from the pressure switch 30, the forklift is determined to be in the working mode by the controller 40, and thus the controller 40 allows the rpm of the engine 1 to increase higher than the preset rpm. In this case, when the driver pushes the accelerator pedal further, the rpm of the engine 1 is increased higher than the preset value so that a sufficient amount of hydraulic oil is supplied to the actuators. Meanwhile, typical forklifts are set such that the traveling speed is proportional to the RPM of the engine. For example, in this embodiment, the forklift is set such that, when the rpm of the engine 1 is 1400 RPM, the traveling speed of the forklift is 8.8 km/hr, when the output of the engine 1 is 2000 RPM, the traveling speed of the forklift is 13.5 km/hr, and, when the rpm of the engine 1 is 2500 RPM, the traveling speed of the forklift is 17.5 km/hr.

Therefore, if the controller 40 is set such that an increase of the rpm of the engine 1 is restricted to the preset rpm, the traveling speed of the forklift can be restricted to a preset speed. Here, it is preferable that the speed restriction value, at which the traveling speed of the forklift is restricted, be set to a value such that a forklift on which cargo is loaded is prevented from tipping over or from striking a person, and such that an appropriate working speed is ensured. In this embodiment, a reference rpm is set to about 2000 RPM, so that the traveling speed of the forklift is restricted to 13.5 km/hr.

The operation of this embodiment of the present invention having the above-mentioned construction will be explained with reference to FIGS. 1 and 2.

First, the case where the forklift is in the traveling mode will be described. When it is desired to travel the forklift, the driver pushes only the accelerator pedal, and does not manipulate the inching pedal. Then, the output of the engine 1 is increased and the hydraulic pump 10 is operated. The operating hydraulic pump 10 pumps the hydraulic oil and supplies the hydraulic oil into the main line 20.

The hydraulic oil, which has been supplied into the main line 20, flows to the control valve 25. After the hydraulic oil enters the control valve 25, the hydraulic oil is thus supplied to the forward clutch 26 or the backward clutch 27. Thereby, the forklift can be in the traveling state.

In the traveling mode, hydraulic oil on the downstream side of the inching valve 24 maintains a pressure higher than the preset pressure. Thus, the pressure switch 30 maintains the OFF state without generating a signal. Therefore, the controller 40 determines that the forklift is in the traveling mode and thus restricts the rpm of the engine 1 to the preset output value (approximately, 2000 RPM).

Figure 2:
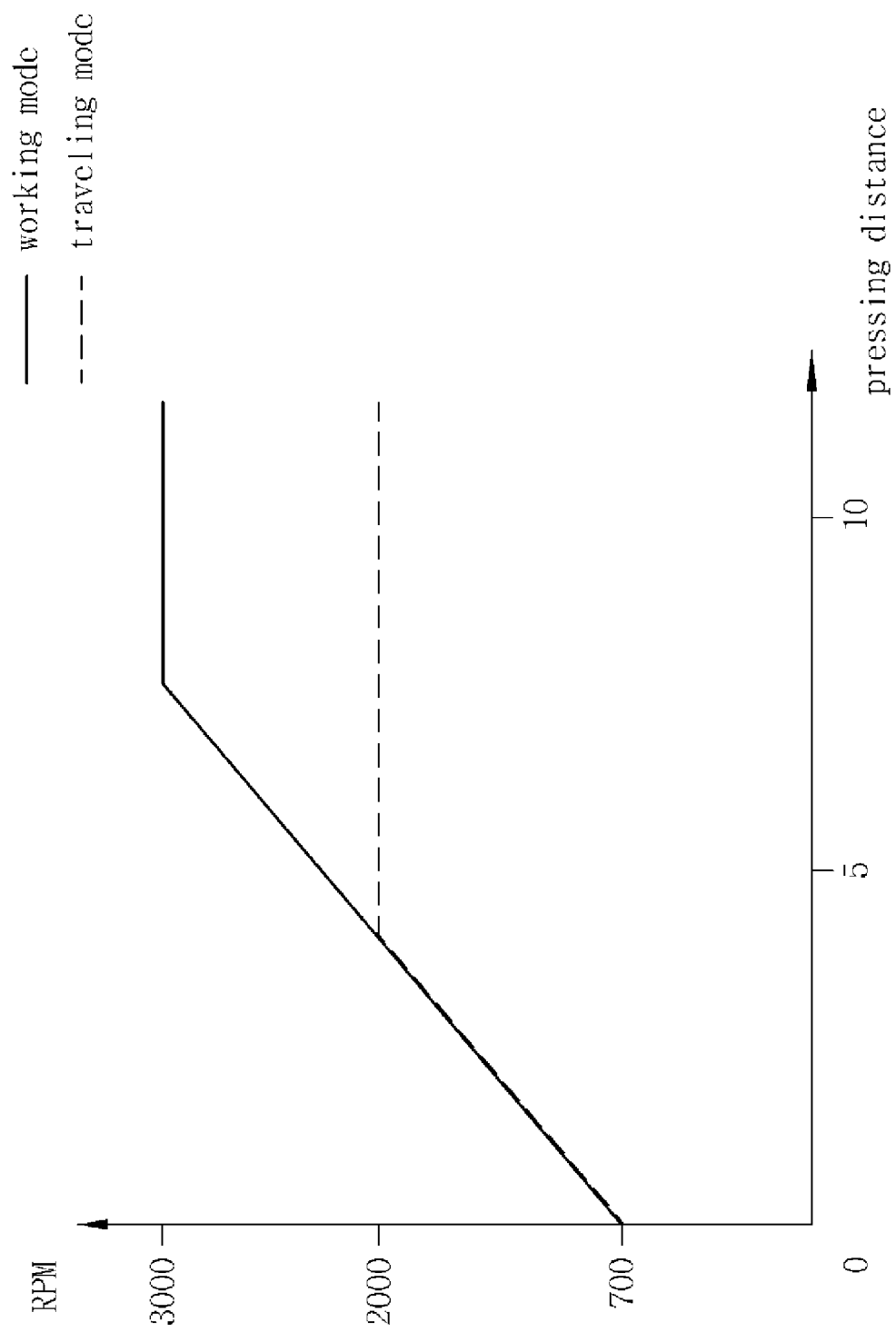
FIG. 2 is a graph showing the RPM of an engine of the forklift as a function of the pressing distance of an accelerator pedal according to the present invention.

That is, as can be appreciated through a traveling mode output line of the engine output graph of FIG. 2, even if the accelerator pedal is further pushed to increase the traveling speed of the forklift, the output of the engine 1 is restricted, so that the traveling speed of the forklift is prevented from increasing higher than the preset speed.

Next, the case where the forklift is in the working mode will be described herein below. When the driver pushes the inching pedal to operate the actuator, the inching valve 24 is operated so that hydraulic oil is supplied from the hydraulic pump 10 into the branch line 22.

The hydraulic oil, which has been supplied into the branch line 22, is supplied to the actuator at high pressure, thus operating the actuator.

Meanwhile, while the inching valve 24 is operated, the pressure of hydraulic oil on the downstream side of the inching valve 24 decreases to the preset pressure or less. Thus, the pressure switch 30 is turned on and outputs a detection signal. Thereby, the controller 40 determines that the forklift is in the working mode and thus allows the output of the engine 1 to increase higher than the preset output value.

That is, as shown in FIG. 2, when the accelerator pedal is further pushed to increase the actuating power of the actuator, the rpm of the engine 1 is increased until it reaches an output limit. Therefore, the flow rate of hydraulic oil supplied into the actuator is increased, thus increasing the actuating power of the actuator.

As described above, the control apparatus of the present invention allows the output of the engine 1 to be increased higher than the preset value in the working mode, during which the inching device is operated, so that the actuator can be smoothly operated. In the traveling mode, during which the inching device is not operated, the control apparatus of the present invention prevents the output of the engine 1 from being increased to a value greater than the preset value, thus restricting the traveling speed of the forklift. Therefore, the present invention allows uninhibited operation of the actuator and also prevents the forklift from being driven at excessive speeds.

Figure 3:
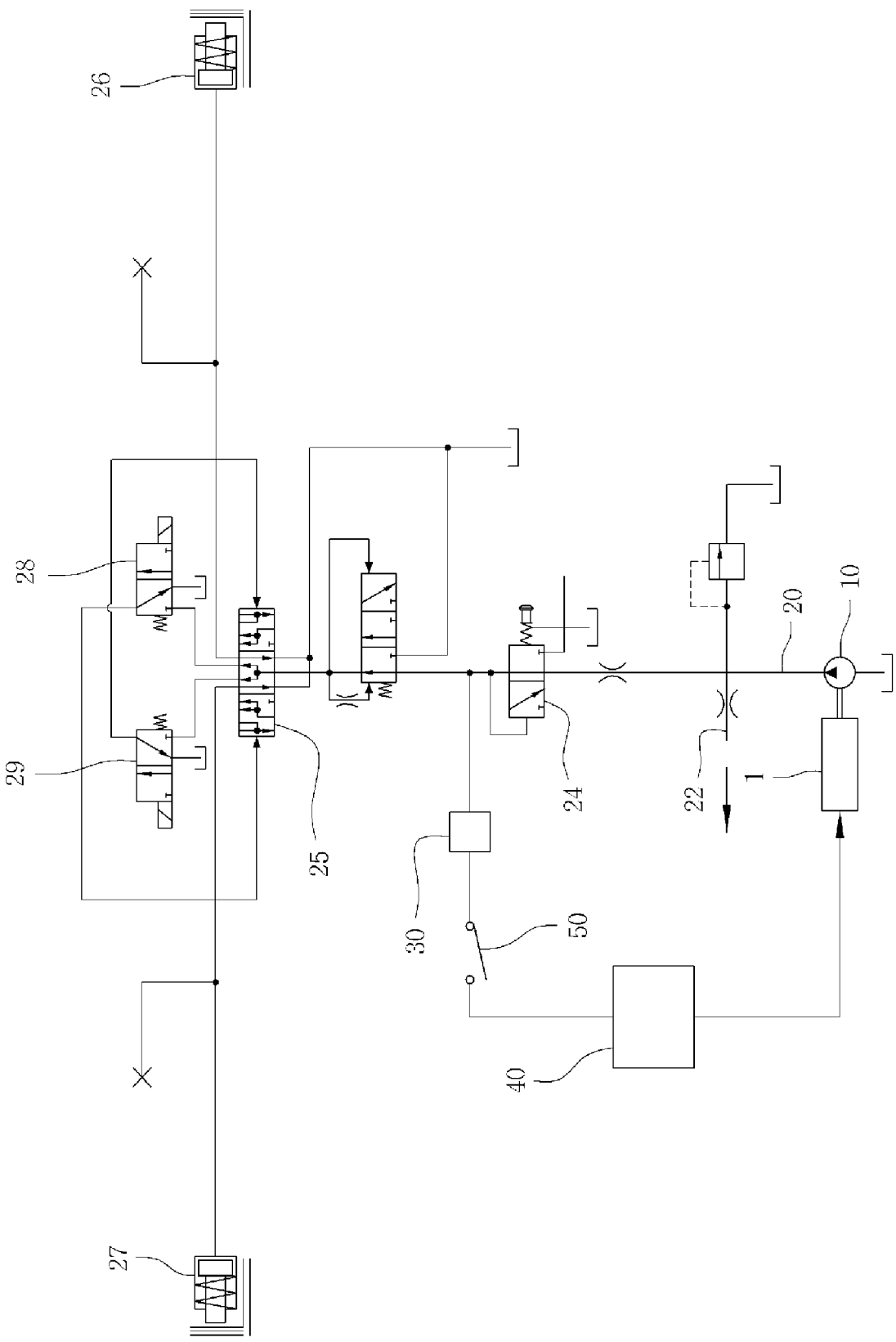
FIG. 3 is a view schematically showing a control apparatus for engine-powered forklifts, according to another embodiment of the present invention.

FIG. 3 illustrates a control apparatus for an engine-powered forklift, according to another embodiment of the present invention.

The control apparatus for engine-powered forklifts according to this embodiment is characterized in that it further includes a control switch 50.

The control switch 50 controls an ON signal of the pressure switch 30 to interrupt the ON signal, which is transmitted from the pressure switch 30 to the controller 40, as necessary. Thus, the function of permitting an increase in the rpm of the engine 1 only in the working mode can be interrupted, is required.

The control switch 50 can be implemented in various methods, for example, a manufacturing company may preset the control switch 50 to meet the requirements of a client when the product is sold, such that it can or cannot be operated by the client. Furthermore, the control switch 50 may be provided around the driver's seat such that the driver can manipulate it.

In this embodiment having the above-mentioned construction, because the function of restricting the output of the engine 1 in the traveling mode can be selectively interrupted, the driver or administrator can efficiently manage the forklift depending on the surrounding conditions.

For example, in places such as a warehouse, where there are likely safety hazards, the control apparatus of the present invention is set such that the output of the engine 1 can be restricted, thus emphasizing the prevention of safety hazards rather than an increase of working efficiency. In places, such as the outdoors, where an increase of working efficiency is emphasized over the prevention of safety hazards, the forklift is used in the state such that the output restriction function of the engine 1 is released in order to optimize working efficiency.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

As described above, the present invention provides a control apparatus for an engine-powered forklift which is constructed such that, in a working mode, in which an inching device is operated, the output of an engine is allowed to increase higher than a preset output value such that an actuator can be smoothly operated, and, in a traveling mode, in which the inching device is not operated, an increase in the output of the engine is restricted, thus restricting the traveling speed of the forklift.

Therefore, as well as having the advantage of allowing uninhibited operation of the actuator, the present invention has an advantage in that, in the case where the forklift is operated in a place where there are safety hazards, the forklift can be prevented from being operated at excessive speeds. Furthermore, because the output restriction function of the engine can be simply implemented using a controller in a software manner, the process of manufacturing the forklift and maintenance thereof are simplified, compared to the conventional art, which uses a mechanical output restriction method.

What is claimed is:

1. A control apparatus for an engine-powered forklift, comprising:

a hydraulic pump operated by an engine;

a main line for supplying hydraulic oil from the hydraulic pump to an actuator and a speed change device;

an inching valve provided on the main line and interrupting supply of the hydraulic oil to the speed change device in a working mode in which the actuator is operated;

mode detecting means for detecting whether the forklift is in a traveling mode or the working mode, the mode detecting means comprising a pressure switch provided on a hydraulic pressure line which connects the inching valve to the speed change device; and a controller to control the engine such that, when the forklift is in the traveling mode, output of the engine is restricted from increasing to a preset output value or more, and, when the forklift is in the working mode, the output of the engine is allowed to increase to the preset output value or more, wherein the pressure switch outputs a detection signal to the controller when a pressure of the hydraulic oil supplied from the inching valve to the speed change device is reduced to a preset pressure or less.

2. The control apparatus for the engine-powered forklift as set forth in claim 1, wherein the preset pressure is a pressure of the hydraulic oil when the supply of the hydraulic oil to the speed change device is interrupted.

3. The control apparatus for the engine-powered forklift as set forth in claim 1, further comprising:

ON/OFF means for turning on/off a function of restricting an increase in the output of the engine when the forklift is in the traveling mode.

4. The control apparatus for the engine-powered forklift as set forth in claim 3, wherein the preset pressure is a pressure of the hydraulic oil when the supply of the hydraulic oil to the speed change device is interrupted.

5. The control apparatus for the engine-powered forklift as set forth in claim 3, wherein the ON/OFF means comprises a control switch which cuts off a transferring of signal output from the pressure switch to the controller selectively.

* * * * *